United States Patent
Yuan et al.

(10) Patent No.: US 8,071,497 B2
(45) Date of Patent: Dec. 6, 2011

(54) PROCESS AND FACILITY FOR REMOVING ONE OR MORE COMPOUNDS

(75) Inventors: Leon Yuan, Rockville, MD (US); Steven M. Poklop, Palatine, IL (US); William D. Schlueter, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 1279 days.

(21) Appl. No.: 11/696,742

(22) Filed: Apr. 5, 2007

(65) Prior Publication Data
US 2008/0156699 A1 Jul. 3, 2008

Related U.S. Application Data

(60) Provisional application No. 60/882,731, filed on Dec. 29, 2006.

(51) Int. Cl.
*B01J 38/44* (2006.01)
(52) U.S. Cl. ............... 502/35; 502/38; 502/56; 208/139
(58) Field of Classification Search .................. 208/134, 208/139, 140; 502/35, 38, 56
See application file for complete search history.

(56) References Cited

U.S. PATENT DOCUMENTS

| | | |
|---|---|---|
| 5,824,619 A | 10/1998 | Sechrist et al. |
| 5,837,636 A | 11/1998 | Sechrist et al. |
| 6,034,018 A | 3/2000 | Sechrist et al. |
| 6,153,091 A | 11/2000 | Sechrist et al. |
| 6,881,391 B1 | 4/2005 | Sechrist |

FOREIGN PATENT DOCUMENTS

| | | |
|---|---|---|
| JP | 10-085559 A | 4/1998 |
| KR | 10-2002-0016145 A | 4/2002 |

OTHER PUBLICATIONS

W.L. Gore and Associates, Catalytic Dioxin/Furan Removal From Flue Gas Streams, 2001, p. 7, Published in: Elkton, MD.
W.L. Gore and Associates, Inc., Technical Conditions for Remedia Catalystic Filter, , p. 2 Published in: Elkton, MD.
Grzegorz Wielgosinski, et al., Catalytic destruction of PCDD/Fs. Effect of temp. and catalyst loading efficiency of 1,2-dichlorobrnzene . . . , Organohalogen Compounds, 2004, pp. 1098-1102, vol. 66 (2004), Publisher: Polish State Committee for Scientific Research, Published in: Poland.

*Primary Examiner* — Walter D Griffin
*Assistant Examiner* — Renee E Robinson
(74) *Attorney, Agent, or Firm* — Maryann Maas

(57) ABSTRACT

One exemplary embodiment is a refinery or a petrochemical production facility. The refinery or petrochemical production facility can include:
  a) a catalyst regeneration zone;
  b) a halogen removal zone; and
  c) an elimination zone for at least one of a dioxin and a furan compound, wherein at least a portion of an effluent from the halogen removal zone is combined with a stream comprising oxygen from the catalyst regeneration zone or halogen removal zone.

19 Claims, 2 Drawing Sheets

PROCESS AND FACILITY FOR REMOVING ONE OR MORE COMPOUNDS

CROSS-REFERENCE TO RELATED APPLICATIONS

This application claims the benefit of U.S. Provisional Application No. 60/882,731 filed Dec. 29, 2006, which is hereby incorporated by reference in its entirety.

FIELD OF THE INVENTION

The invention relates to a process and facility for removing one or more compounds.

BACKGROUND OF THE INVENTION

Numerous hydrocarbon conversion processes can be used to alter the structure or properties of hydrocarbon streams. Generally, such processes include: isomerization from straight chain paraffinic or olefinic hydrocarbons to more highly branched hydrocarbons, dehydrogenation for producing olefinic or aromatic compounds, reformation to produce aromatics and motor fuels, alkylation to produce commodity chemicals and motor fuels, transalkylation, and others.

Typically such processes use catalysts to promote hydrocarbon conversion reactions. As the catalysts deactivate, it is generally desirable to regenerate them. Such moving bed regeneration systems are known, and exemplary systems, which also disclose the removal of chlorides from a regeneration vent gas stream, are disclosed in U.S. Pat. Nos. 5,837,636 (Sechrist et al.), 6,034,018 (Sechrist et al.), and 6,881,391 B1 (Sechrist). However, these systems suffer from a common shortcoming, namely they fail to disclose the destruction from a vent gas stream of undesirable compounds, such as furans and dioxins that can have a negative environmental impact.

SUMMARY OF THE INVENTION

One exemplary embodiment is a process for removing at least one of a dioxin and a furan. The process can include:

a) passing a first stream from a catalyst regeneration zone including halogen and at least one of a dioxin and a furan through a halogen removal zone having an adsorbent to adsorb at least one halogen; and b) combining the first stream from the halogen removal zone with a second stream from a heater from the catalyst regeneration zone or a cooler for the first stream to obtain a combined stream at a temperature of above about 150° C. and an oxygen content no less than about 1%.

Another exemplary embodiment is a process for catalytically removing at least one of a dioxin and a furan. The process can include combining a first stream from a halogen removal zone with a second stream. Generally, the second stream includes at least a portion of a heater discharge stream from a catalyst regeneration zone or a coolant stream for the first stream to obtain a combined stream to pass through an elimination zone to remove at least a portion of at least one of a dioxin and a furan.

Yet another exemplary embodiment is a refinery or a petrochemical production facility. Generally, the refinery or petrochemical production facility includes:

a) a catalyst regeneration zone;

b) a halogen removal zone; and c) an elimination zone for at least one of a dioxin or a furan compound. At least a portion of an effluent from the halogen removal zone can be combined with a stream comprising oxygen from the regeneration zone or halogen removal zone.

Thus, the present systems permit the combination of a vent gas stream that can have inadequate temperature and oxygen to an existing process stream that provides sufficient heat and oxygen, so generally operating conditions are sufficient to catalytically destroy harmful compounds, such as dioxins and furans. Such a treatment removes undesirable compounds that otherwise would possibly require other expensive treatments before being discharged to the atmosphere. Moreover, the present systems permit altering the temperature and oxygen content of the incoming gas stream to the elimination zone without the expense of an additional heater. What is more, should the throughput through the heater for the drying zone be reduced due to required regeneration conditions, the present embodiments can improve existing heater operations by increasing the total throughput through the heater.

DEFINITIONS

Figure 1:
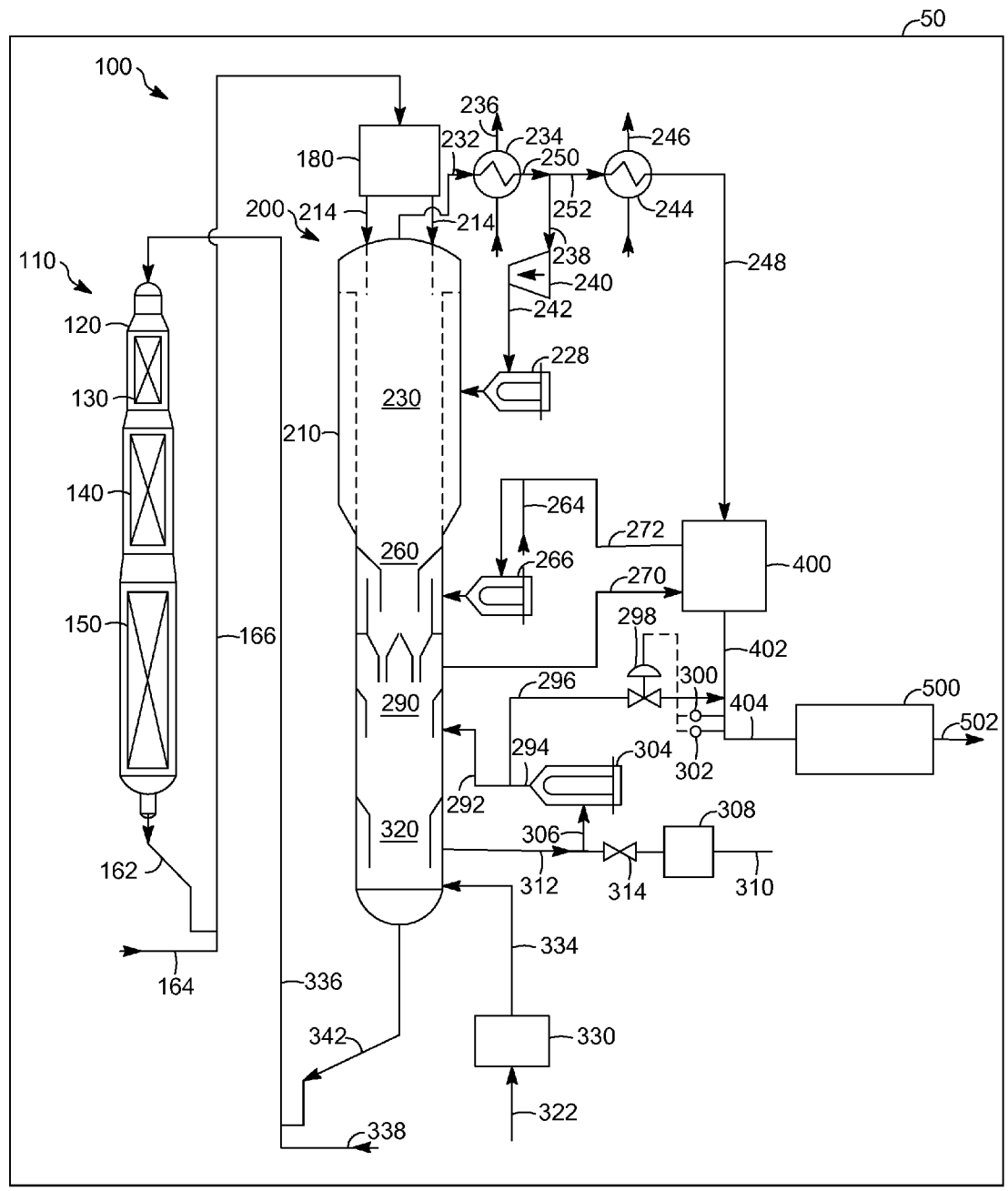
FIG. 1 is a schematic process flow diagram showing an exemplary embodiment disclosed herein.

As used herein, the term "zone" can refer to an area including one or more equipment items and/or one or more sub-zones. Additionally, an equipment item, such as a reactor or vessel, can further include one or more zones or sub-zones.

As used herein, the term "adsorption" can refer to the retention of a material in a bed containing an adsorbent by any chemical or physical interaction between a material, such as a halogen, and the bed, and includes, but is not limited to, adsorption and/or absorption. The removal of the material from an adsorbent is referred to herein as "desorption."

As used herein, the term "dioxin" can refer to one or more compounds from a family of chlorinated dioxins, including 2,3,7,8-tetrachlorodibenzo-p-dioxin (TCDD).

As used herein, the term "furan" can refer to a compound consisting of a furan heterocyclic compound, or a compound including a furan radical.

As used herein, the term "halogen-containing material" can include a halogen molecule, such as chlorine or fluorine, or a compound containing one or more independent halogen radicals. Examples of a halogen-containing material can include chlorine, fluorine, and hydrogen chloride.

DETAILED DESCRIPTION

Before referencing the drawing figures, a system for destroying at least one of a dioxin and a furan can include a reforming reaction zone, a catalyst regeneration zone, a halogen removal zone, and lines and equipment communicating with these zones as disclosed in, e.g., U.S. Pat. Nos. 6,881,391 B1 (Sechrist) and 6,034,018 (Sechrist et al.), which are hereby incorporated by reference in their entirety. So, these zones are described schematically in the context of the present embodiments. Some equipment, such as a seal drum and lock hopper, and lines, e.g., hydrogen and nitrogen lines, which are known to those of skill in the art in this technical area, are omitted for focusing the discussion on the preferred embodiments. The hydrocarbon flow through the reforming reaction zone and accompanying equipment, e.g. heat exchangers and furnaces, known to those of skill in the art are also omitted.

The systems and processes disclosed herein can be applicable to a wide range of catalytic hydrocarbon conversion processes and the regeneration of their catalysts, including aromatic isomerization, paraffin or olefin isomerization, paraffin dehydrogenation, and alkylation. Vent gas streams from regeneration units of such processes can contain dioxins and furans, which may require removal if the streams are discharged to the atmosphere.

Generally, these hydrocarbon processes utilize catalyst, which typically contain a metal, such as a noble Group VIII metal, and a halogen, such as chlorine or fluorine. However, catalytic reforming can be a widely practiced hydrocarbon conversion process that uses catalyst regeneration and to which the method disclosed herein applies. Reforming catalysts typically contain chlorine. An exemplary catalytic reforming process is described in U.S. Pat. No. 5,837,636 (Sechrist et al.). The catalyst, which is often in particulate form, may include an alumina, such as an activated alumina, a silica alumina, a molecular sieve, or an alumina-silicate clay. An alumina-silicate clay may include a kaolin, an attapulgite, a sepiolite, a polygarskite, a bentonite or a montmorillonite, particularly when the clays have not been washed by acid to remove substantial quantities of alumina. Such catalysts are disclosed in U.S. Pat. No. 6,034,018 (Sechrist et al.).

Referring to FIG. 1, a refinery, such as a refining facility, or a petrochemical production facility 50 can include a system 100 for destroying at least one of a dioxin and a furan in a regeneration zone vent gas stream. The system 100 can include a reforming reaction zone 110 and a catalyst regeneration zone 200. The reforming reaction zone 110 can include a reactor 120, desirably in a stacked reactor arrangement, and may typically include three or four reaction zones, such as a first reaction zone 130, a second reaction zone 140, and a third reaction zone 150.

The path of the catalyst to and from the reforming reaction zone 110 and the catalyst regeneration zone 200 is depicted. Particularly, the catalyst can enter at the top of the reactor 120, pass through the reaction zones 130, 140, and 150, and exit through a line 162. Subsequently, the catalyst may be contacted with a lifting gas, such as nitrogen, in a line 164. Generally, the catalyst then travels through a line 166 to a disengager 180, which can contain the spent catalyst before entering a catalyst regeneration vessel 210 through lines 214. The catalyst regeneration vessel 210 can include a combustion zone 230, a halogenation zone 260, a drying zone 290, and a cooling zone 320. Generally, the catalyst travels through the combustion zone 230 to, e.g., burn off coke deposits, then may enter the halogenation zone 260 to re-disperse a catalytically-active metal with an agent, such as a chloride agent, and then can enter the drying zone 290 to remove any moisture.

The combustion zone 230 can include a recycle loop for recycling most of its gases with a portion vented as, e.g., a purge, and treated before being discharged. The gas for the combustion zone 230 can originate from the other zones 260, 290, and 320. The vent gas from the catalyst regeneration vessel 210 may include portions of gases from the cooling zone 320, the drying zone 290, the halogenation zone 260, and the combustion zone 230. The gas from the combustion zone 230 can leave through a line 232 to be cooled by an exchanger 234 with a cooling fluid in the line 236, and then exit the exchanger 234 at a line 250. Desirably, the exchanger 234 is an indirect heat exchanger using any suitable fluid, such as air or water. After exiting, the gas can be split and a portion can travel in a line 238 to travel to a blower 240 and, optionally, be heated after passing through a line 242 to a heater 228. The exchanger 234 and heater 228 can assist in controlling the temperature of the gas recycling into the combustion zone 230. This combustion gas recycle loop is disclosed in, e.g., FIG. 1 and column 10 of U.S. Pat. No. 6,881,391 B1 (Sechrist). Alternatively, the exchanger 234 and the blower 240 can be switched, or additional equipment, such as blowers and compressors, can be utilized if, e.g., it is desirable to reheat the catalyst below the burn zone or to improve transferring of the gas.

The gas entering the halogenation zone 260 originates at least in part from the drying zone 290, after being passed through a line 270 to desorb an adsorbent in the halogen removal zone 400. Generally, the halogenation zone 260 receives a halogen-containing material in a line 272, such as a hydrogen chloride, after being heated to a desired inlet temperature by a heater 266, to re-disperse the metal on the catalyst. If the halogenation levels are too low, a chlorine-containing material, such as a chlorinated paraffin can be added in a line 264. The desorbent gas flow from the drying zone 290, through the halogen removal zone 400, and into the halogenation zone 260 is disclosed in U.S. Pat. No. 6,881,391 B1 (Sechrist) at, e.g., FIGS. 1 and 2 and their accompanying description.

The gas entering the drying zone 290 to dry the catalyst is generally air, and can be passed from a line 310 through a dryer 308 if a valve 314 is open. Alternatively, the gas, which is generally air, may be received from the cooling zone 320, as described hereinafter. The air can pass through a line 306 to be heated in a heater 304, and exit via a heater discharge 294. The gas is split after the discharge 294, with a portion passing through a line 296 (described hereinafter with reference to an elimination zone 500) and the other portion passing through a line 292 into the drying zone 290.

After exiting the drying zone 290, optionally the catalyst can enter a cooling zone 320 to reduce the temperature of the catalyst. Generally, air can be provided via a line 322, and dried in an air dryer 330 before entering the cooling zone 320 via a line 334. The air exiting the cooling zone 320 can exit via a line 312 into the line 306 to be heated in the heater 304. An exemplary cooling zone is disclosed in, for example, U.S. Pat. No. 5,824,619 (Sechrist et al.).

After exiting the cooling zone 320, the catalyst can enter a seal drum and lock hopper (not depicted in the drawing) and return to the reforming reaction zone 110 via lines 342 and 336. Hydrogen can be added by a line 338 and may at least partially reduce the catalytically-active metal on the catalyst before entering the reforming reaction zone 110.

Usually, the catalyst regeneration zone 200 provides several regeneration functions. These functions include combusting coke, disbursing the metal on the catalyst, halogenating the catalyst, oxidating the catalyst, drying the catalyst, and reducing the catalyst. These functions are described in more detail in U.S. Pat. No. 6,881,391 B1 (Sechrist).

Referring to the vent gases split from the combustion recycle loop, these gases can travel through the line 252 at a typical catalyst regeneration temperature of about 371-about 538° degrees C. (about 700-about 1,000° F.) to be cooled in a cooler 244 with any suitable fluid in a line 246, such as air or water. Afterwards, the vent gases can travel in a line 248 to a halogen removal zone 400.

Generally, the halogen removal zone 400 operates in two modes, namely adsorption and desorption, to remove one or more halogen-containing materials. Typically, the halogen removal zone 400 has a bed containing adsorbent that can include a molecular sieve, a silica gel, a carbon, an alumina, a spent hydrocarbon conversion catalyst, or a combination thereof. The halogen removal zone 400 can include a single adsorption bed, but preferably the halogen removal zone 400 can include two adsorption beds operating in swing mode, as disclosed in FIG. 2 and accompanying description of U.S. Pat. No. 6,881,391 B1 (Sechrist). During the adsorption mode, a portion of the gas from the combustion recycle loop is treated to remove chlorine-containing material.

Typically, the vent gas stream that enters the adsorbent bed contains from about 50-about 10,000 mole-ppm hydrogen chloride and from about 1-about 500 mole-ppm chlorine in the line 248. The temperature of the gas entering a bed in adsorption mode is typically at about 149-about 260° C. (about 300-about 500° F.) Only rarely would the adsorption temperatures exceed about 402° C. (about 756° F.) Generally, the temperature is maintained above the dew point temperature of the vent gas and the capillary condensation temperature, as disclosed in U.S. Pat. No. 6,881,391 B1 (Sechrist).

The gas in the vent gas stream can contain not only oxygen and chlorine, but also may contain hydrogen chloride as well as undesirable compounds, such as dioxins and furans. The halogenation removal zone 400 typically removes chlorine and hydrogen chloride, but to a lesser degree does not reduce the amount of dioxins and furans to levels that are desired for venting such streams to the atmosphere. As a consequence, it is desirable to add an elimination zone 500 for removing at least one of a dioxin and a furan.

Generally, the gas exits the halogen removal zone 400 at a temperature of about 110-about 218° C. (about 230-about 424° F.) or about 126-about 205° C. (about 259-about 401° F.) and an oxygen content of less than about 1%. However, it is generally desirable to destroy dioxins and furans at a temperature above about 180° C. (about 356° F.) and an oxygen content of not less than about 1%, preferably not less than about 3%. Consequently, it is desirable to obtain a combined stream in a line 404 that is at a suitable temperature and oxygen content to catalytically destroy dioxin and furan compounds by converting them into carbon dioxide, water, and hydrogen chloride.

To obtain proper conditions, generally, the gas flow through the line 402 can have gasses added through the line 296 from the heater discharge 294 of the heater 304 to be combined in the line 404. The air from the discharge 294 can be about 500-about 600° C. (about 932-about 1112° F.), preferably about 538-about 565° C. (about 1000-about 1049° F.), and an oxygen content of up to about 21% by volume or even up to about 39% by mole by utilizing at least one oxygen enrichment device. An exemplary oxygen enrichment device is disclosed at columns 14 and 15 of U.S. Pat. No. 6,153,091 (Sechrist et al.). Desirably, the gases entering the elimination zone 500 can include about 17-about 47% of the discharge air as a portion of the gas flow in the line 404. The temperature and oxygen content in the line 402 can be controlled by an oxygen analyzer/controller 300 and a temperature analyzer/controller 302 in conjunction with a valve 298. By controlling the amount of gas from the discharge 294 of the heater 304, the content of the gas entering the elimination zone 500 can be controlled to optimum conditions for allowing the destruction of furans and dioxins.

The elimination zone 500 can include a catalyst in a catalytic reactor, such as a fixed bed. One exemplary catalyst is an oxidative catalyst. An exemplary catalytic metal for a catalyst can be an active metal or alloy of 1) vanadium, e.g., vanadium, vanadium-tungsten, or vanadium-molybdenum, 2) chromium, or 3) perovskite on a titanium dioxide carrier. As such, the process conditions inside the elimination zone 500 may be about 230-about 300° C. (about 446-about 572° F.) for a vanadium catalyst, about 300-about 400° C. (about 572-about 752° F.) for a chromium catalyst, and about 500-about 600° C. (about 932-about 1112° F.) for a perovskite catalyst at a catalyst load of about 5000-about 10,000 hr$^{-1}$.

Alternatively, the elimination zone 500 can include a filter sold under the trade designation REMEDIA® by W.L. Gore and Associates, Inc. of Elkton, Md. Generally, the filter includes a microstructured membrane, preferably a membrane sold under the trade designation GORE-TEX® by W.L. Gore & Associates of Elkton, Md., laminated to a catalytically-active felt. Alternatively, the elimination zone 500 may include another type of catalytic filter or catalyst for destroying furans and/or dioxins, such as a catalytic ceramic filter sold under the trade designation CERAFIL TOKAT by Clear Edge of Glasgow, Scotland, United Kingdom. The catalytic ceramic filter can operate at a temperature greater than about 220° C. (about 430° F.). Another exemplary catalyst for destroying at least one of a furan and a dioxin is sold by CRI Catalyst Company of Houston, Tex., which can operate as low as about 160° C. (about 320° F.). In one preferred embodiment, the filter is a REMEDIA® filter.

Usually, the operating temperature for the elimination zone 500 is above the dew point. However, generally the temperature excursions should not exceed about 260° C. (about 500° F.) for more than five minutes per day and should not exceed about 274° C. (about 525° F.). Generally, the temperature of the gases entering the elimination zone 500 is above about 150° C. (about 300° F.), typically about 150-about 274° C. (about 300-about 525° F.), preferably about 160-about 260° C. (about 320-about 500° F.), optimally about 180-about 260° C. (about 356-about 500° F.) and an oxygen content is not less than about 1%, preferably not less than about 3%. Generally, the oxygen content of the stream entering the elimination zone 500 is about 1%-about 16%, preferably about 1%-about 8%, optimally about 3-about 6.7%. Typically, the filter velocity can be about 1 m$^3$/m$^2$/minute, and the pressure, desirably in pulses, can be about 448-about 586 kpa(a) (about 65-about 85 psi(a)) absolute.

Generally, the catalytic filter can process a gas stream in the line 404 having less than about 500 ppm of silicone, less than about 500 ppm of phosphorus, less than about 1% of elemental and oxide arsenic, less than about 1% of elemental and oxide lead, and less than about 500 ppm of sulfur dioxide. With respect to sulfur dioxide, if the temperature is above about 230° C. (about 446° F.), there is no sulfur dioxide limit. Generally, particles are captured on the membrane, and dioxins and furans are chemically destroyed within the felt.

The elimination zone 500 with a catalytic filter can be multi-functional, namely that it is possible to remove virtually all dust components from the exhaust gas stream and convert dioxins and furans to environmentally acceptable substances, such as carbon dioxide, water, and hydrogen chloride. A typical catalytic filter system can destroy more than about 99% of the dioxins and furans in the line 404. Generally, such a filter can reduce particulate emissions to meet local environmental regulations. Afterwards, the gas exiting the elimination zone 500 can pass through a line 502, to, for example, the atmosphere.

Figure 2:
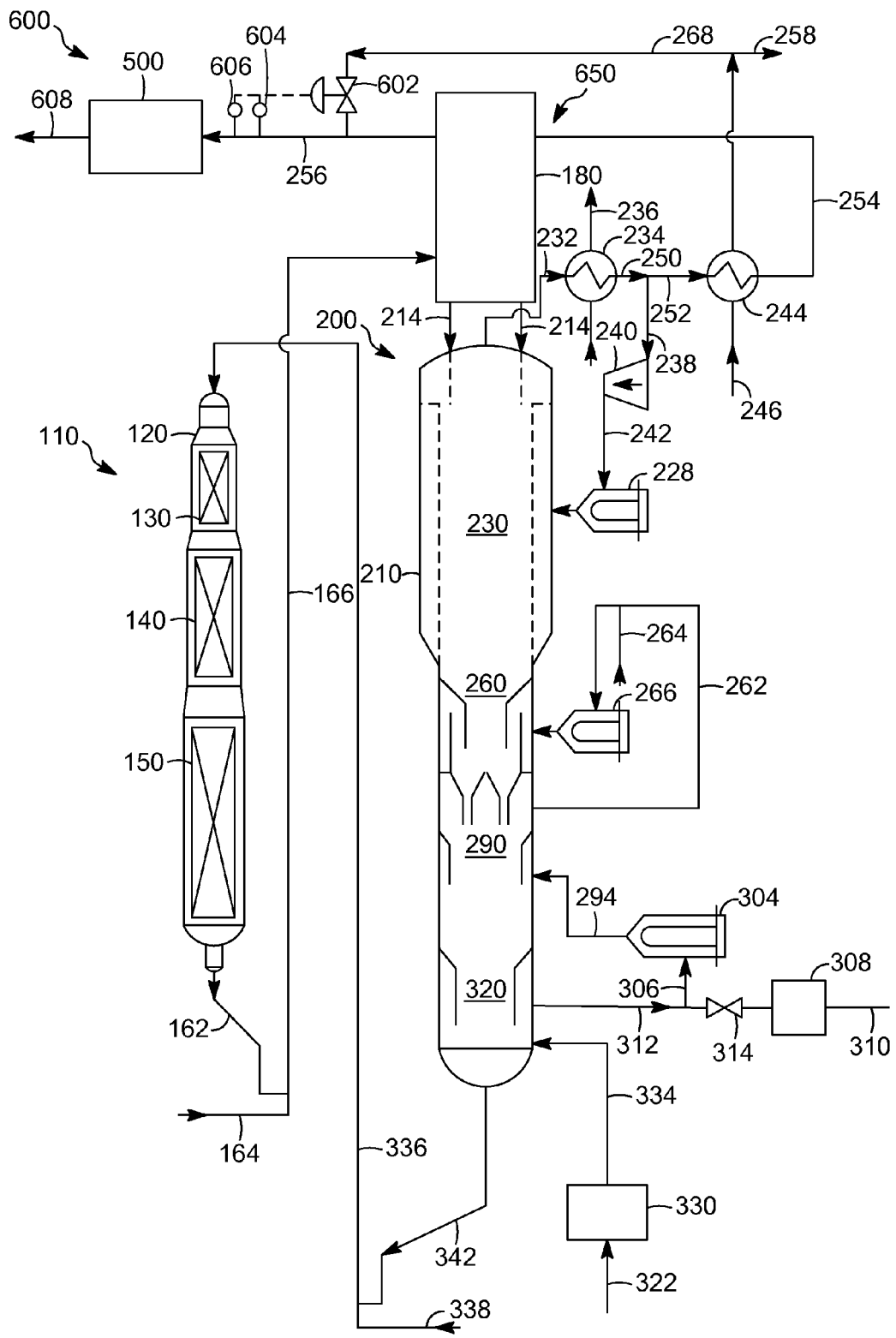
FIG. 2 is a schematic process flow diagram showing an exemplary embodiment disclosed herein.

Another exemplary system 600, which may also be incorporated in a refinery or a petrochemical production facility albeit not depicted, for removing dioxins and furans is depicted in FIG. 2. Units and vessels that are described in FIG. 1, are repeated with the same numerals and reference numbers. Consequently, these units will not be described in further detail herein. In the system 600, generally a halogen removal zone 400 is replaced with a halogen removal zone 650, including the disengager 180 containing spent catalyst for removing chlorine-containing material, such as hydrogen chloride. The spent catalyst may not adsorb sufficient amounts of dioxin and furan compounds for at least some environmental standards.

Moreover, the entire discharge 294 of the heater 304 can be sent to the drying zone 290 and the incoming gas stream to the halogenation zone 260 does not include regeneration gases from a halogen removal zone. Rather, gases are provided in a line 262 from the drying zone 290. Thus, the zones 260 and 290, and respective lines communicating therewith, are substantially as those disclosed at FIG. 6 and accompanying description in U.S. Pat. No. 6,881,391 B1 (Sechrist). Alternatively, at least a portion of the discharge 294 can be sent to the line 268 and the elimination zone 500 and replace some if not all of the gases provided by the line 246.

Particularly, the vent gas from the combustion zone 230 can be routed through the exchanger 234 and the cooler 244 in a line 254, and passed through the disengager 180 to remove chlorides, as disclosed in U.S. Pat. No. 6,034,018 (Sechrist et al.). Although the disengager 180 is depicted as a different shape than in FIG. 1., it should be understood that the disengager 180 can be of any suitable size or shape. Generally, the temperature of the gas entering the disengager 180 after being cooled is about 66-about 482° C. (about 151-about 900° F.), and preferably about 149-about 260° C. (about 300-about 500° F.). The pressure is generally from about 0-about 3447 kpa(a) (about 0-about 500 psi(a)) absolute, and preferably about 103-about 689 kpa(a) (about 15-about 100 psi(a)) absolute. The hourly space velocity is generally about 5-about 20,000 $hr^{-1}$, and preferably about 10-about 1,000 $hr^{-1}$.

Generally, the gas exiting the disengager 180 has an oxygen content of less than about 1% and a temperature that can range from less than about 180° C. (about 356° F.), which are below the operating parameters of the elimination zone 500, as discussed above. As a result, a portion of the air stream in the line 246 that is used to cool a portion of the vent gas from the combustion zone 230 can be sent through a line 268 and pass a valve 602 to form a combined stream in a line 256, while excess gas in the line 246 can be vented to the atmosphere through a line 258. Typically, the gas in the line 246 is air with an oxygen content of up to about 21%, by volume, and is provided by a compressor (not shown). Generally, the gas in the line 246 passes through the cooler 244 where it is heated by the vent gas in the line 252. In some instances, the gas in the line 246 exiting the cooler 244 can exceed about 400° C. (about 752° F.), or even about 500° C. (about 932° F.). The gas in the line 246 can exit the cooler 244 at a sufficiently high temperature to raise the temperature of the gases exiting the disengager 180.

To add the proper amounts of the gas in the line 268 with the effluent from the disengager 180, an oxygen analyzer/controller 604 and a temperature analyzer/controller 606 can be used in conjunction with the valve 602 to control the amount of added air from the line 268 combined with the effluent from the disengager 180. The combined gas stream in the line 256 can be passed through the elimination zone 500 to destroy the furans and dioxins, as discussed above. Subsequently, the effluent can then be discharged through a line 608 to, e.g., the atmosphere.

Although air is preferably combined with gases entering the elimination zone 500, it should be understood that any suitable oxygen-containing gas stream may be utilized. Additionally, not only can the halogen removal zone 400 have an adsorbent as disclosed above, other mechanisms may be used along with or instead of the adsorbent. As an example, the halogen removal zone 400 may include a scrubber utilizing water or a caustic wash in a column to adsorb or absorb one or more halogen-containing materials. Moreover, additional blowers and compressors may be utilized to transfer fluids to and from the halogen removal zone 400, and optionally at least one of other equipment and zones.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by volume, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process, comprising:
   a) passing a first stream from a catalyst regeneration zone comprising halogen and at least one of a dioxin and a furan through a halogen removal zone comprising an adsorbent to adsorb at least one halogen;
   b) combining the first stream from the halogen removal zone with a second stream from a heater from the catalyst regeneration zone or a cooler for the first stream to obtain a combined stream at a temperature of above about 150° C. and an oxygen content no less than about 3%, by volume; and
   c) passing the combined stream through an elimination zone to remove at least a portion of at least one of a dioxin and a furan.

2. The process according to claim 1, wherein the adsorbent comprises a molecular sieve, a silica gel, a carbon, an alumina, or a combination thereof.

3. The process according to claim 1, wherein the elimination zone comprises a membrane and catalytically-active-felt laminate to remove at least a portion of at least one of a dioxin and a furan from the combined stream.

4. A process according to claim 1, further comprising passing a drying stream through the heater to dry catalyst in a drying zone in the catalyst regeneration zone.

5. The process according to claim 4, wherein the drying stream comprises air.

6. The process according to claim 1, wherein the halogen removal zone comprises a disengager containing an adsorbent comprising a spent hydrocarbon conversion catalyst, which is in the disengager prior to entering the catalyst regeneration zone.

7. The process according to claim 6, further comprising passing the combined stream through a membrane and catalytically-active-felt laminate in the elimination zone to remove at least a portion of at least one of a dioxin and a furan.

8. The process according to claim 1, wherein the temperature of the combined stream is about 160°-about 260° C.

9. The process according to claim 1, wherein the oxygen content of the combined stream comprises about 3% about 16%, by volume.

10. The process according to claim 1, wherein the elimination zone comprises a catalyst, in turn comprising vanadium, chromium, or perovskite on a titanium dioxide carrier.

11. The process according to claim 1, wherein the first stream is cooled before entering the halogen removal zone.

12. The process according to claim 1, wherein the second stream comprises air.

13. The process according to claim 12, wherein the second stream passes through the cooler to reduce the temperature of the first stream exiting a combustion zone of the regeneration zone before combining at least a portion of the second stream with the first stream exiting the halogen removal zone.

14. The process according to claim 13, wherein at least a portion of the second stream is discharged to the atmosphere.

15. The process according to claim 1, wherein at least a portion of a drying stream from the catalyst regeneration zone comprises the second stream and is combined with the first stream.

16. A process for catalytically removing at least one of a dioxin and a furan, comprising combining a first stream from a halogen removal zone with a second stream comprising at least a portion of a heater discharge stream from a catalyst regeneration zone or a coolant stream for the first stream to obtain a combined stream having an oxygen content no less than about 3%, by volume to pass through an elimination zone to remove at least a portion of at least one of a dioxin and a furan.

17. A process for removing at least one of a dioxin and a furan, comprising:
   a) passing a first stream from a catalyst regeneration zone comprising halogen and at least one of a dioxin and a furan through a halogen removal zone comprising an adsorbent to adsorb at least one halogen;
   b) combining the first stream from the halogen removal zone with a second stream from a heater from the catalyst regeneration zone to obtain a combined stream at a temperature of above about 150° C. and an oxygen content no less than about 3%, by volume; and
   c) passing the combined stream through an elimination zone to remove at least a portion of at least one of a dioxin and a furan.

18. The process according to claim 17, further comprising providing a drying gas from the heater comprising a portion, in turn, comprising the second stream, and another portion comprising air provided to a drying zone of the catalyst regeneration zone.

19. The process according to claim 18, further comprising providing a halogen-containing material from the halogen removal zone to a halogenation zone in the catalyst regeneration zone.

* * * * *